A. L. BAUSMAN.
CONTINUOUS COOKER.
APPLICATION FILED JAN. 2, 1912.

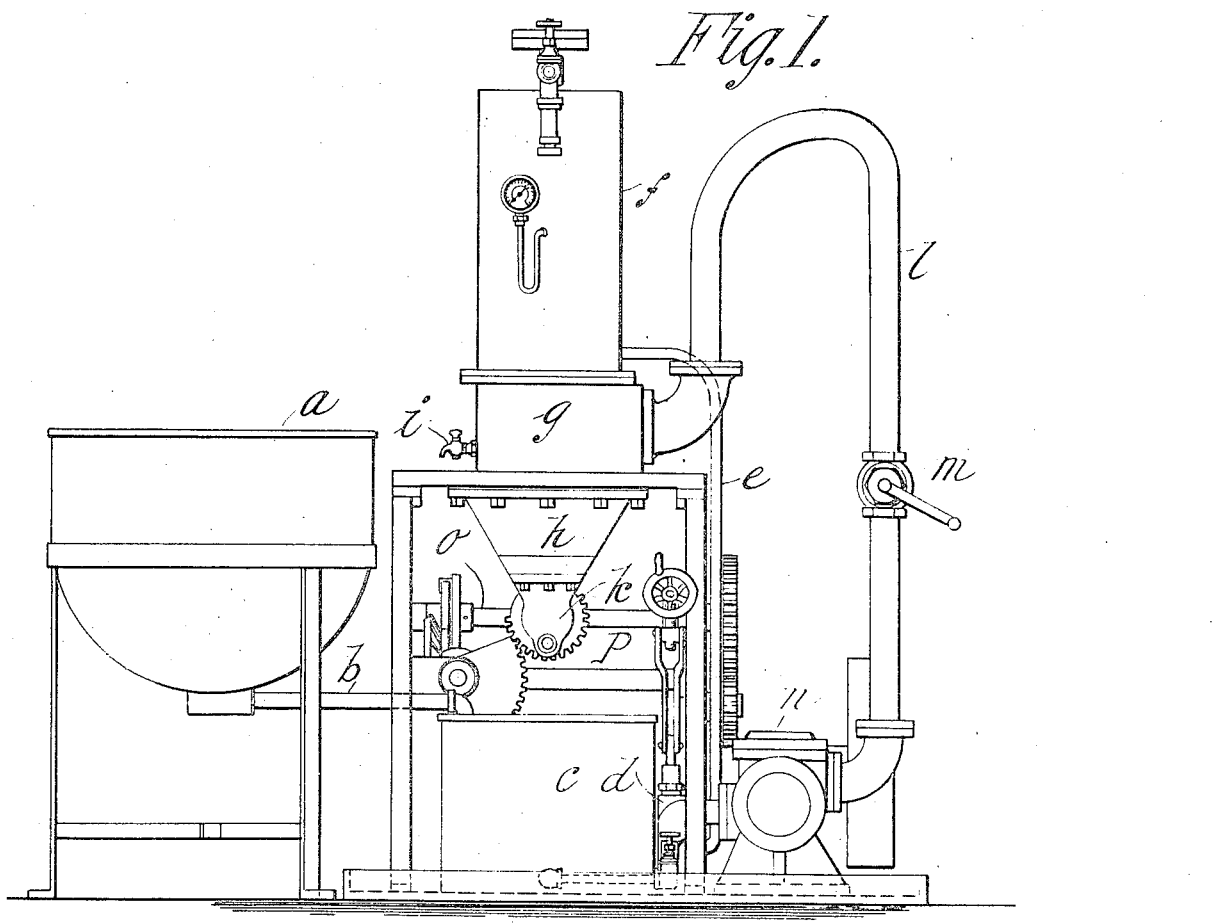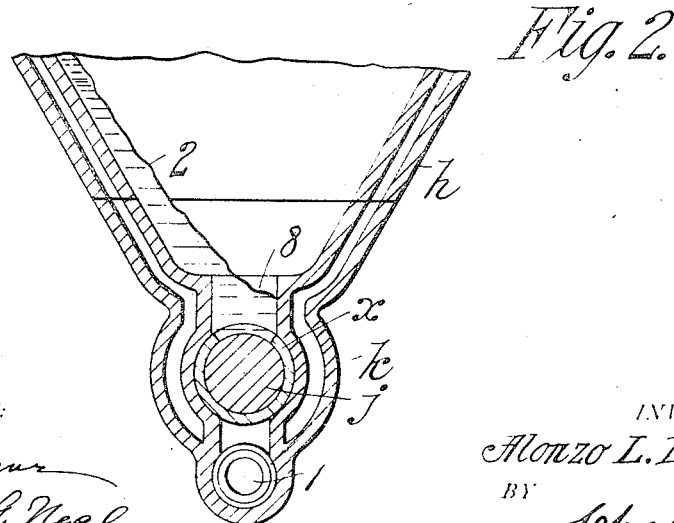

1,141,862.

Patented June 1, 1915.
2 SHEETS—SHEET 2.

WITNESSES:
H. L. Sprague
Franklin L. Neal

INVENTOR,
Alonzo L. Bausman,
BY
Chapin & Co
ATTORNEYS

UNITED STATES PATENT OFFICE.

ALONZO LINTON BAUSMAN, OF CHICOPEE, MASSACHUSETTS, ASSIGNOR TO NATIONAL EQUIPMENT COMPANY, OF SPRINGFIELD, MASSACHUSETTS, A CORPORATION OF MASSACHUSETTS.

CONTINUOUS COOKER.

1,141,862.  Specification of Letters Patent.  Patented June 1, 1915.

Application filed January 2, 1912. Serial No. 668,988.

*To all whom it may concern:*

Be it known that I, ALONZO LINTON BAUSMAN, a citizen of the United States of America, residing at Chicopee, in the county of Hampden and State of Massachusetts, have invented new and useful Improvements in Continuous Cookers, of which the following is a specification.

This invention is an improvement in apparatus known as "continous cookers" used in candy making and especially in the manufacture of what are known as "hard goods", which are cooked at high temperatures.

So-called "continuous cookers" have been used heretofore, but these machines, as far as applicant knows, have not cooked continuously. The process has been as follows: The candy mixture was brought to a temperature of about 232° Fahrenheit in a melting kettle; the melted mixture was then drawn off through a pipe to a receiving tank, and from there pumped at any desired speed through a coil surrounded with live steam under pressure. From the coil, the cooked syrup was discharged into a vacuum pan or chamber which allowed all the gases, etc., due to the cooking in the steam coil, to escape through the vacuum-creating pump. When enough cooked syrup was in the vacuum pan, the vacuum was broken and another pan substituted for the full pan, after which the vacuum was again obtained and the process repeated.

The object of the present invention is to make the process of cooking candy continuous so that no substituting of one pan for another takes place and the vacuum is maintained continuously.

Other objects of the invention will appear in the detailed description and annexed claims.

Figure 3:
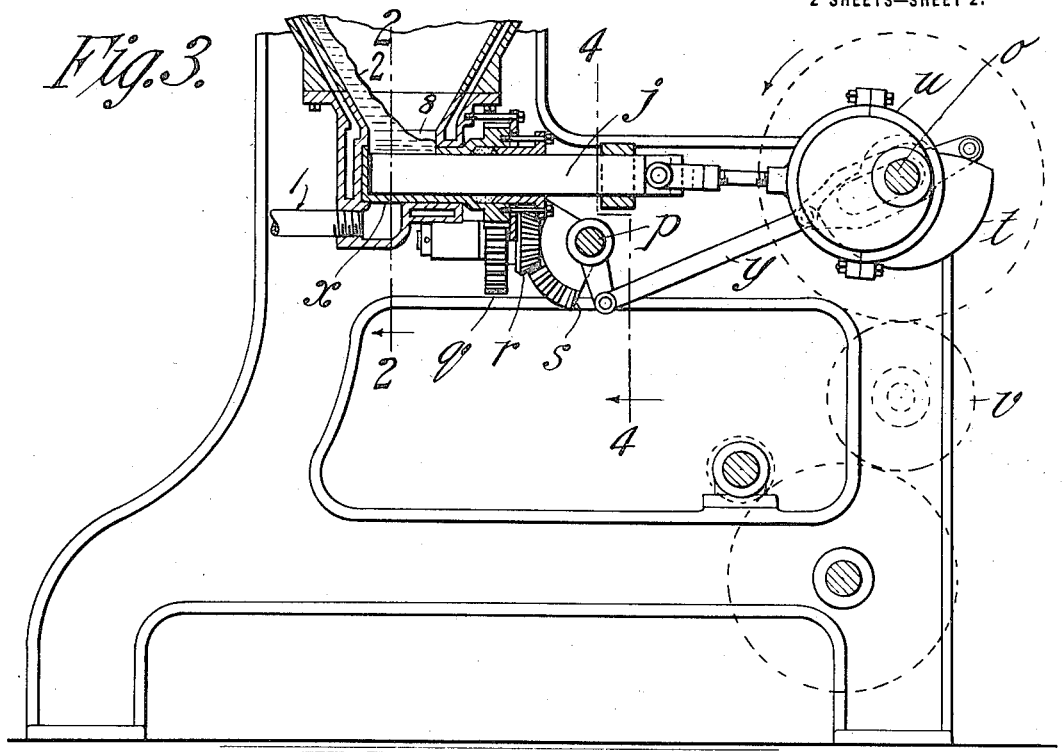
Figure 4:
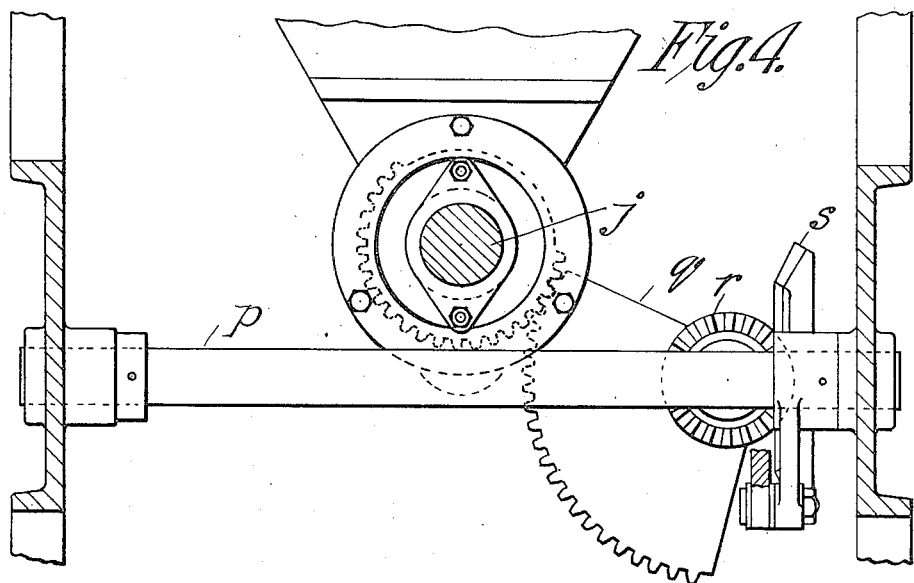

In the drawings forming part of this application,—Figure 1 is a general view of the assembled apparatus embodying the invention. Fig. 2 is a cross sectional detail view of the lower part of the vacuum pan or chamber showing means for discharging the syrup without breaking the vacuum. Fig. 3 is a part cross sectional view of the mechanism for discharging the syrup from the vacuum chamber. Fig. 4 is a cross sectional view of the apparatus taken on the line 4—4, Fig. 3.

The general operation can best be understood from Fig. 1, and the specific operation from Figs. 2, 3, and 4.

In Fig. 1, the ingredients composing the mixture are brought to a temperature of about 232° Fahrenheit in the kettle $a$. The melted mixture is then drawn off through the pipe $b$ into the receiving tank $c$, from which tank the pump $d$, operating from the main shaft $o$, sends the syrup at the desired speed through a coil of pipe in the chamber $f$. This coil of pipe is surrounded by steam under a pressure of 45 to 65 pounds, or other pressure, as the capacity of the apparatus may require. The steam enters through the regulating means shown at the top of the tank. The syrup takes a certain time to pass through the coil during which time it is cooked. The coil of pipe in the chamber $f$ discharges through the chamber $g$ to the chamber $h$. A vacuum is maintained in these chambers by the pump $n$ and through the pipe $l$. The pump is driven by any suitable means, as indicated. As the cooked syrup passes through the vacuum in chambers $g$ and $h$, the gases, etc., from the cooking process, escape by the pipe $l$. The syrup is removed from the chamber $h$ without breaking the vacuum in a manner now to be described. As indicated in Fig. 2, the syrup flows down the sides of the chamber $h$ and passes to the pump cylinder by the passage 8. In this cylinder a piston $j$ (see Fig. 3) is arranged to reciprocate, and a sleeve, partly inclosing the piston, is arranged to rotate. This pump cylinder should be of large capacity and have large inlet and outlet ports, as 8 and 1 seen in Figs. 2 and 3. As the syrup does not flow rapidly, and because of the problems involved in pumping from a vacuum, it is advisable to depend on weight alone for filling the pump cylinder. When the inlet opening is large, the syrup readily falls through the inlet 8. The rotatable sleeve $x$ has an opening therein to register with the opening 8, and when rotated 180° to register with the opening 1.

The operation of the pump can best be understood from an inspection of Fig. 3. The piston $j$ is retracted from the position shown in this figure, whereupon the syrup falls through the opening registering with the inlet 8 into the rotatable sleeve. The sleeve is then rotated 180°, when it registers with the opening 1, and the opening 8 is closed by the sleeve. The piston $j$ is then forced to the left and expels the syrup through the opening 1. The sleeve is then rotated to its original position with its opening registering with the opening 8, and the piston $j$ is withdrawn for another operation similar to the one described. This operation of the piston and sleeve continues as long as the apparatus is in use, and will keep the chamber $h$ practically empty, which allows the syrup falling from the pipe within the casing $f$ to pass through a large vacuum space wherein it can be thoroughly freed from all gases, etc., through the pipe $l$. Whenever it is desired to break the vacuum in the chambers $g$ and $h$ for any reason, the valve $m$ is closed and the valve $i$ is opened.

The means by which the piston $j$ and the rotatable sleeve $x$ are operated will now be pointed out: The main shaft $o$ is operated through any suitable source, as through a pulley not shown. Mounted on this shaft $o$ are an eccentric $u$ and a cam $t$. The eccentric $u$ drives the piston $j$ through the connecting strap, as indicated in Fig. 3. A shaft $p$ is mounted in the frame, as indicated in Figs. 1 and 3, and on this shaft $p$ is fixed a segmental gear $s$ which is adapted to mesh with a beveled gear $r$ mounted on a stud shaft indicated in Fig. 3. On this same stud shaft is mounted a segmental gear $q$, indicated in Fig. 4, which is adapted to mesh with a mutilated gear on the outer periphery of the rotatable sleeve. Therefore, when this gear is rotated, the rotatable sleeve is rotated. Motion is transmitted to the shaft $p$ (see Fig. 3) by means of the link $y$ and the cam $t$. When the cam $t$ operates the link $y$, the sleeve $x$ is rotated by means of the gear connections described above. The eccentric $u$ and the cam $t$ are so designed that the sleeve will be rotated at the proper time with respect to the reciprocations of the piston $j$. It will thus be seen that the apparatus works continually as long as desired and is, in fact, a continuous cooker, for it is only necessary to keep the melting kettle $a$ working in order to supply material for the cooking apparatus. It is never necessary to change the kettle $h$, as is customary in the machines at present on the market.

The discharging pump, located at the bottom of the chamber $h$, is especially designed for the work that it is to do, and it can be readily appreciated that an ordinary form of pump could not perform the work, and that a special form of pump specifically designed for the work is necessary.

By means of the apparatus described, the capacity of a cooker for hard goods is greatly increased and the number of machines for a given capacity in any factory may be cut down below the number heretofore necessary.

What I claim, is:—

1. In a continuous cooker, a chamber adapted to receive the cooked syrup, means for obtaining a vacuum in said chamber, and a discharging mechanism at the outlet of the chamber comprising a reciprocating plunger, a sleeve surrounding the plunger, except for a space corresponding to the outlet of the chamber, means for withdrawing the plunger when the open space in the sleeve registers with the outlet, means for rotating the sleeve until the open space therein registers with an outlet port, and means for thereupon advancing the plunger to discharge the syrup.

2. A container adapted to contain syrup, means for creating a vacuum therein, and means for discharging the syrup from the container without breaking the vacuum therein comprising an outlet large enough for the syrup to readily fall therethrough, a rotatable cylinder with an opening to register with the outlet, a piston within the cylinder, means for rotating the cylinder to close the outlet for the chamber and until the opening of the cylinder registers with an outlet port, and means for thereafter forcing the piston into the cylinder to expel the syrup through the outlet port.

3. A container adapted to contain syrup, said container having a spacious outlet, means for creating a vacuum therein, and discharging mechanism comprising a rotatable sleeve with an opening to register with the outlet of the container, an outlet pipe, a plunger in the sleeve, and means to withdraw the plunger when the opening in the sleeve registers with the outlet allowing the syrup to fall into the sleeve, means for rotating the sleeve until the opening registers with the outlet pipe and closes the outlet of the container, and means to thereupon force the plunger in the sleeve to expel the syrup through the outlet pipe, whereby a continuing vacuum is maintained in the container.

4. A container adapted to contain syrup, said container having a spacious outlet, means for creating a vacuum therein, an outlet pipe for the container, discharging mechanism located between the outlet for the container and the outlet pipe, operable to open the spacious outlet and close the outlet pipe and then to close the spacious outlet and open the outlet pipe, whereby the vacuum is maintained in the container.

5. In a continuous cooker and in combination, a vacuum chamber having a discharge outlet, and means associated with the outlet whereby the contents of the chamber may be positively discharged, said means being so constructed as to at no time allow communication from the exterior to the interior of said chamber.

ALONZO LINTON BAUSMAN.

Witnesses:
WALTER M. ALDEN,
FRANKLIN G. NEAL.